No. 725,474. PATENTED APR. 14, 1903.
T. V. PAGE, J. T. HUNTINGTON & M. C. WALLS.
BROADCAST SEED SOWER.
APPLICATION FILED APR. 28, 1902.
NO MODEL. 2 SHEETS—SHEET 1.
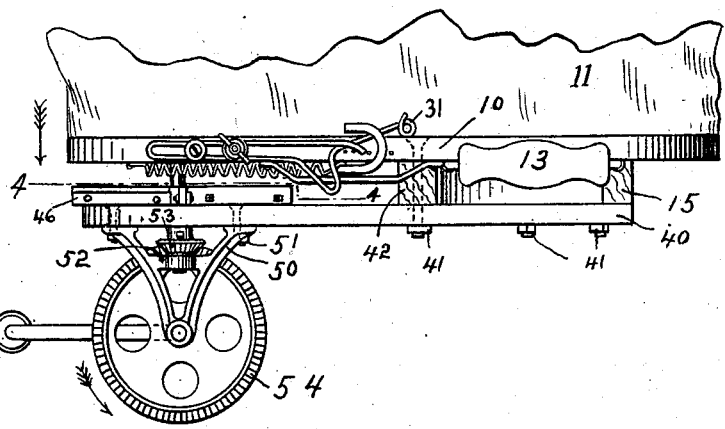
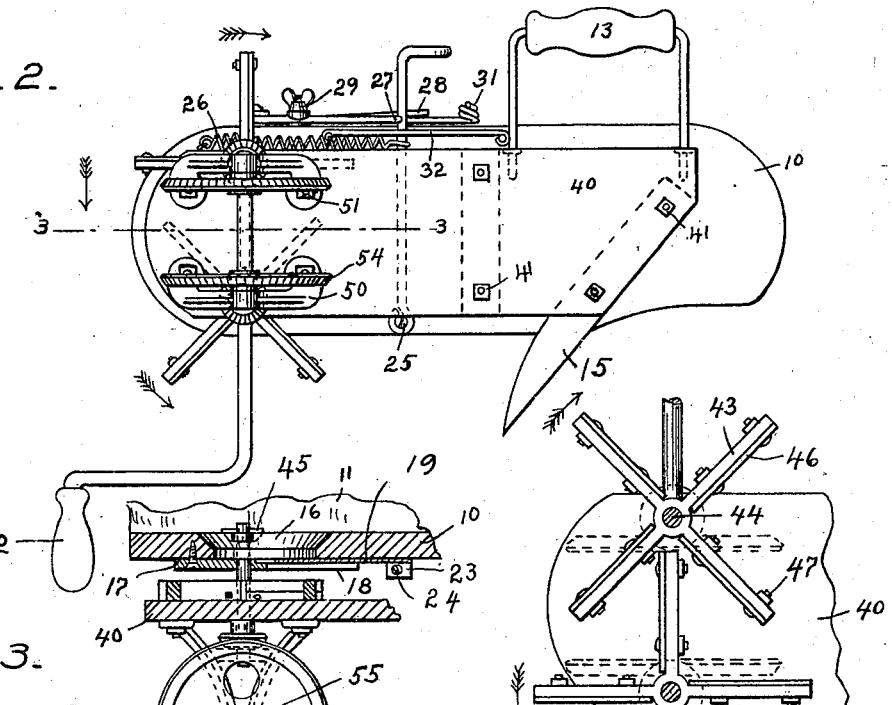
WITNESSES:
W. L. Bushong
F. E. Bryant
INVENTORS
Thomas V. Page,
John T. Huntington, and
Marion C. Walls
By V. H. Lockwood
ATTORNEY.

No. 725,474. PATENTED APR. 14, 1903.
T. V. PAGE, J. T. HUNTINGTON & M. C. WALLS.
BROADCAST SEED SOWER.
APPLICATION FILED APR. 28, 1902.
NO MODEL. 2 SHEETS—SHEET 2.
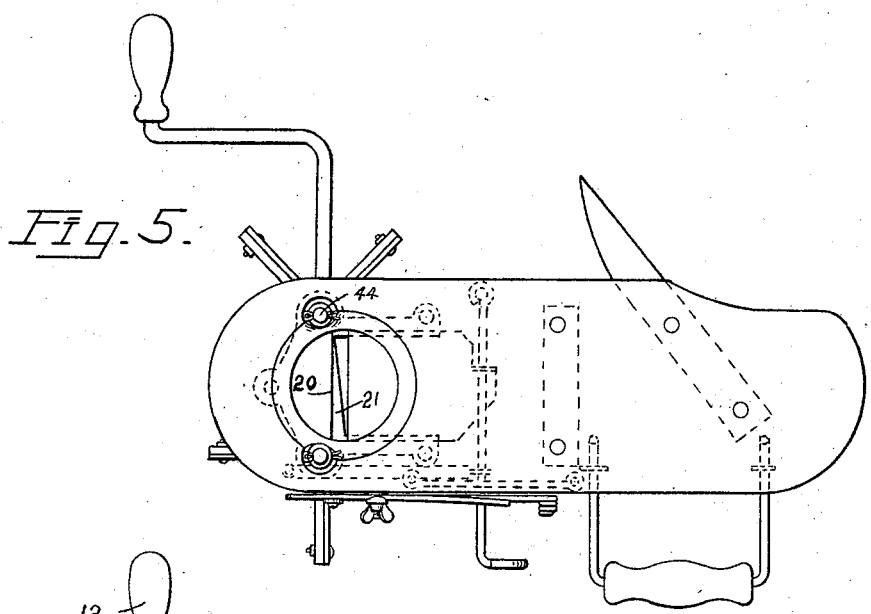
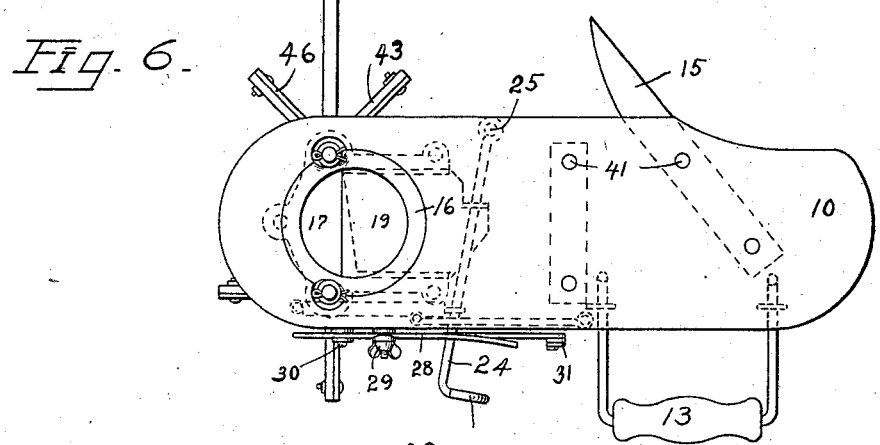
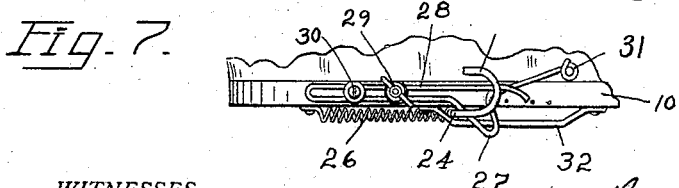
WITNESSES:
W. L. Bushong.
F. E. Bryant.
INVENTORS
Thomas V. Page,
John T. Huntington, and
Marion C. Walls.
By V. H. Lockwood.
ATTORNEY.

UNITED STATES PATENT OFFICE.

THOMAS V. PAGE, JOHN T. HUNTINGTON, AND MARION C. WALLS, OF INDIANAPOLIS, INDIANA.

BROADCAST SEED-SOWER.

SPECIFICATION forming part of Letters Patent No. 725,474, dated April 14, 1903.

Application filed April 28, 1902. Serial No. 105,012. (No model.)

*To all whom it may concern:*

Be it known that we, THOMAS V. PAGE, JOHN T. HUNTINGTON, and MARION C. WALLS, of Indianapolis, county of Marion, and State of Indiana, have invented a certain new and useful Broadcast Seed-Sower; and we do hereby declare that the following is a full, clear, and exact description thereof, reference being had to the accompanying drawings, in which like letters refer to like parts.

This invention relates to broadcast seed-sowers carried by a man and hand-operated and having horizontally-rotating seed-distributers to fling the seed horizontally in all directions.

One feature of this invention consists in the use of a pair of oppositely-rotatable seed-distributers having arms that intermesh and the combination of a board on which the seed is deposited and the distributer mounted on the upper side thereof with radial arms that during their rotation sweep the seed off of the seed-board.

Another feature of the invention is means for holding the sliding plate or valve which closes the seed-outlet when open, so that the same may be instantly closed and may be operated by the hand that holds the device stationary and may be adjusted to regulate the size of the outlet-opening, as desired.

The foregoing and other features of this invention will be understood from the accompanying drawings and the following description and claims.

In the drawings, Figure 1 is an elevation of the left-hand side of the device, the seed-bag being partly broken away. Fig. 2 is a bottom view of the device. Fig. 3 is a central vertical longitudinal section of the forward end of the device. (See the line 3 3 of Fig. 2.) Fig. 4 is a plan view of the forward end of the seed-board and the seed-distributers thereon, parts being in section and parts broken away. (See line 4 4 of Fig. 1.) Fig. 5 is a plan view of the device with the seed-bag removed and the seed-outlet opened. Fig. 6 is the same with the seed-outlet closed. Fig. 7 is an elevation of the left-hand side of the forward portion of the bottom of the seed-bag, the bag being partly broken away and showing the means for regulating the seed-outlet.

In detail the seed-bag is made with the wooden bottom 10 and canvas sides 11, which may be supported by a strap over the shoulder of the person using the device. The right hand of the person using the device operates the crank 12, while his left hand holds the device stationary by the handle 13 on the left side of the bottom of the seed-bag. 15 is a bar secured under the bottom of the seed-bag and projecting to form a rest for the device against the body of the person using it. A round orifice 16 is made in the forward end of the bottom of the seed-bag. A plate 17 is secured on the under side of the bottom 10 of the seed-bag that partially closes said orifice and has a straight transverse edge 20, with a ledge 21, the edge of which is inclined at a slight angle to the edge 20 and with an extension 18 on each side to furnish a pair of guideways for the plate or valve 19, which closes the remainder of said orifices or regulates the size of the seed-outlet therethrough. The plate 19 slides on said extensions 18, and its forward edge is rectangular, so that when the orifice is closed such edge rests on the ledge 21 and against the edge 20 of the plate 17.

The sliding plate or valve 19 has a downward lug 23 at its rear end, as seen in Fig. 3, through which a lever 24 extends. Said lever is pivoted at 25 to the under side of the bottom of the seed-bag and extends beyond the bottom of the seed-bag to the left and has a rearward bend to form a finger-piece that is near the handle 13, whereby said lever can be operated easily by a finger of the hand holding said handle and the valve-plate 19 be actuated for opening or closing the outlet from the seed-bag. A spiral spring 26 is secured at one end to the forward portion of the bottom 10 of the seed-bag on the under side at the other end to said lever 24 to draw said lever forward and close the valve-plate 19 and keep it closed. Said valve-plate is opened by withdrawing the end of the lever 24 and is held open by the stop 27, extending downward from the wire or piece 28, that is held in place on the side of the bottom 10 of the seed-bag by the clamping-screws 29 and 30, whereby said piece 28 and stop 27 may be adjusted forward or rearward in order to determine the maximum size of the seed-outlet. Stop 27 is a downward bend of the wire 28, inclined on the forward side, so the lever 24 can pass under and push it up out of the way as the lever is drawn rearward. The rear face of the stop is substantially vertical and has secured to it a rearwardly-extending finger-piece 31. When the device is in use and the parts are in the position shown in Fig. 1 and it is desired to stop the movement of the seed through the outlet in the seed-bag, it is done suddenly by elevating the finger-piece 31 with a finger of the hand that is holding the handle 13, which causes the stop 27 to be elevated out of engagement with the lever 24, whereupon the spring 26 draws said lever forward and closes the plate 19. A guideway for the movement of the lever 24 is made by a bar 32, secured to the under side of the bottom of the seed-bag and parallel therewith, as appears in Figs. 1 and 7.

The seed drops from the seed-bag through the orifice 16 upon a seed-board 40, that is secured below the seed-bag to the bottom thereof by the bolts 41 and is separated from the bottom thereof by the bars 15 and 42. It is held sufficiently away from the bottom of the seed-bag to allow for the mounting of the seed-distributers 43. (Shown in Fig. 4.) There is a pair of coöperating distributers 43, which are reel-like, each having in what is here shown, four radiating arms. They are mounted on the vertical shafts 44, the upper end of which extends through the metal plate 17 and bottom of the seed-bag and are held there by cotter-pins 45. The two distributers are placed opposite each other, one on each side of the center of the device, as shown in Fig. 4, and the two shafts 44 are close enough together to cause the arms of the distributers to intermesh as they rotate. Since there is one distributer on each side of the seed-outlet the seed will drop upon the board 40 between the distributers, so that the arms thereof can readily sweep forward and outward. In order that these arms may accomplish this work well, an elastic or rubber brush 46 is secured to the forward side of each arm by the bolts 47 and extends down into sweeping engagement with the board 40. These rotary distributers are rotated in opposite directions by the means shown in Figs. 1 and 2. On the under side of the seed-board 40, near the forward end, a pair of downwardly-extending brackets 50 are secured by the bolts 51. These brackets are V-shaped and have cross-pieces 52, in which the lower ends of the shafts 44 have bearings, as appears in Figs. 1 and 5. Below the seed-board 40 beveled pinions 53 are secured to the shafts 44 in a horizontal position to mesh with the large bevel-gears 54, mounted vertically on the horizontal shaft 55, that is mounted in the lower ends of the brackets 50 and which carries the crank 12 for driving the same.

The advantage of the use of double rotary seed-distributers that coöperate with each other is that the seed is thrown and sown equally on each side and in front, which is difficult if not impossible with a single distributer.

What is claimed to be our invention, and desired to be secured by Letters Patent, is—

1. In a broadcast seed-sower, a pair of seed-distributers horizontally rotatable in opposite directions having radial arms that intermesh as they rotate.

2. In a broadcast seed-sower, a pair of parallel vertical shafts, means for driving them in opposite directions, and a seed-distributer horizontally mounted on each shaft having radial arms, the shafts being close enough together for the arms of the distributers to intermesh.

3. In a broadcast seed-sower, a plate on which the seed is deposited, a rotatable seed-distributer mounted immediately above the plate having radial arms, and brushes secured to said arms that sweep the plate.

4. In a broadcast seed-sower, a seed-receptacle with an inflexible bottom having a seed-outlet through it, a plate secured below said bottom and parallel therewith to receive the seed as it comes from the seed-receptacle, and means operative between said bottom and plate for distributing the seed that falls on said plate.

5. In a broadcast seed-sower, a plate on which the seed is deposited, and a pair of seed-distributers rotatable in opposite directions and mounted immediately above said plate having radial arms that sweep the plate and intermesh as they rotate.

6. In a broadcast seed-sower, a plate on which the seed is deposited, a pair of parallel vertical shafts extending through said plate, a single means for driving them, and a seed-distributer horizontally mounted on each shaft immediately above the plate having radial arms that sweep the plate, the shafts being close enough together for said arms to intermesh.

7. In a broadcast seed-sower, a plate on which the seed is deposited, a pair of parallel vertical shafts extending through said plate, a bevel-pinion on the lower end of each of said shafts, a pair of brackets extending down from the under side of said plate, a horizontal shaft mounted in said brackets, means for driving the horizontal shaft, a pair of bevel-gears secured to said horizontal shaft and meshing with said bevel-pinions, a seed-distributer horizontally mounted on each of said vertical shafts immediately above the plate having radial arms that sweep said plate during rotation, the shafts being close enough together for said arms to intermesh.

8. In a broadcast seed-sower, a seed-receptacle with an inflexible bottom having a seed-outlet through it, a valve-plate for controlling said outlet, a lever pivoted to the said bottom at one end with the other end extending to one side of the bottom and having a finger-catch at its end turned rearwardly, a handle connected with the bottom near said finger-catch for operating said lever, a rigid connection between the valve-plate and said lever, a spring for drawing said lever forward, a stop for holding said lever in its inward position, means for mounting said stop on the side of the bottom, and means connected with said stop that extends near said handle for releasing the stop, substantially as shown and described.

In witness whereof we have hereunto affixed our signatures in the presence of the witnesses herein named.

THOMAS V. PAGE.
JOHN T. HUNTINGTON.
MARION C. WALLS.

Witnesses:
FLORENCE E. BRYANT,
V. H. LOCKWOOD.